United States Patent
Xu

(10) Patent No.: US 12,114,141 B2
(45) Date of Patent: Oct. 8, 2024

(54) MOBILE TERMINAL AND CONTROL METHOD

(71) Applicant: VIVO MOBILE COMMUNICATION CO., LTD., Chang'an Dongguan (CN)

(72) Inventor: Mingjun Xu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 364 days.

(21) Appl. No.: 17/551,957

(22) Filed: Dec. 15, 2021

(65) Prior Publication Data

US 2022/0132250 A1    Apr. 28, 2022

Related U.S. Application Data

(63) Continuation of application No. PCT/CN2020/095530, filed on Jun. 11, 2020.

(30) Foreign Application Priority Data

Jun. 25, 2019 (CN) .......................... 201910554350.5

(51) Int. Cl.
  *H04R 5/04* (2006.01)
  *G10L 19/16* (2013.01)
(52) U.S. Cl.
  CPC ................ *H04R 5/04* (2013.01); *G10L 19/16* (2013.01)
(58) Field of Classification Search
  CPC ..................................................... G06F 3/162
  USPC ........................................................ 700/94
  See application file for complete search history.

(56) References Cited

U.S. PATENT DOCUMENTS

| | | | | |
|---|---|---|---|---|
| 4,038,496 A | * | 7/1977 | Feezor | A61B 5/121 |
| | | | | 73/585 |
| 2005/0084120 A1 | * | 4/2005 | Hagino | H03F 1/305 |
| | | | | 381/120 |
| 2005/0195991 A1 | | 9/2005 | Wang et al. | |
| 2007/0040471 A1 | * | 2/2007 | Ollila | H02N 2/026 |
| | | | | 310/317 |
| 2008/0049952 A1 | | 2/2008 | Jung | |
| 2010/0004936 A1 | | 1/2010 | Chao | |

(Continued)

FOREIGN PATENT DOCUMENTS

| | | |
|---|---|---|
| CN | 101132172 A | 2/2008 |
| CN | 102984626 A | 3/2013 |

(Continued)

OTHER PUBLICATIONS

International Search Report and Written Opinion related to Application No. PCT/CN2020/095530; reported on Sep. 16, 2020.

(Continued)

*Primary Examiner* — Alexander Krzystan
(74) *Attorney, Agent, or Firm* — von Briesen & Roper, s.c.

(57) ABSTRACT

A mobile terminal and a control method are provided. The mobile terminal includes an audio codec and a control chip, where the audio codec has sound channel output pins, the control chip and the audio codec are electrically connected to each other, and the control chip is configured to output a voltage compensating signal to the audio codec in processes of enabling and disabling the audio codec, so that a direct current bias voltage of the sound channel output pins is 0V in the processes of enabling and disabling the audio codec.

7 Claims, 2 Drawing Sheets

(56) References Cited

U.S. PATENT DOCUMENTS

| | | |
|---|---|---|
| 2017/0111735 A1 | 4/2017 | Ego |
| 2017/0230023 A1 | 8/2017 | Hong |
| 2018/0212569 A1* | 7/2018 | Zhu ........................ H03F 1/30 |
| 2020/0228069 A1* | 7/2020 | Yin ......................... H03F 1/30 |
| 2021/0242847 A1* | 8/2021 | Singleton ............ H03F 3/45645 |
| 2023/0017092 A1* | 1/2023 | Fox ................... H02M 3/33571 |

FOREIGN PATENT DOCUMENTS

| | | |
|---|---|---|
| CN | 104244141 A | 12/2014 |
| CN | 104378715 A | 2/2015 |
| CN | 110267142 A | 9/2019 |
| JP | 2005159871 A | 6/2005 |
| JP | 2017076878 A | 4/2017 |
| KR | 100681559 B1 | 2/2007 |

OTHER PUBLICATIONS

Extended European Search Report related to Application No. 20831621.6; reported on Jun. 27, 2022.
First Japanese Office Action related to Application No. 2021-572939; reported on Jan. 26, 2023.

* cited by examiner

A voltage compensating signal is output to an audio codec in processes of enabling and disenabling the audio codec of a mobile terminal, so that a bias voltage of sound channel output pins of the audio codec is 0V in the processes of enabling and disenabling the audio codec ⸺ 201

MOBILE TERMINAL AND CONTROL METHOD

CROSS-REFERENCE OF RELATED APPLICATION

This application is a continuation application of International Application No. PCT/CN2020/095530 filed on Jun. 11, 2020, which claims priority to Chinese Patent Application No. 201910554350.5 filed in China on Jun. 25, 2019, which are incorporated herein by reference in their entireties.

TECHNICAL FIELD

The present disclosure relates to the field of communications technologies, and in particular, to a mobile terminal and a control method.

BACKGROUND

It is commonly known that earphones are one of the important functions of a mobile terminal, and a user can use earphones to listen to music, make a phone call, go live streaming, and the like. Therefore, the signal quality of a voice signal in an earphone channel may directly affect user experience. In a mobile terminal in a related technology, before a voice signal is received for playing through earphones and perceived by a user, the voice signal needs to be sent to an audio codec integrated circuit (IC) for audio decoding. Due to processing and uniformity of the audio codec, there is a component of tens to hundreds of uV or even tens to hundreds of mV of direct current in processes of enabling and disabling. The minor direct current component can affect the earphones, and a pop sound (popping) is generated.

SUMMARY

Embodiments of the present disclosure provide a mobile terminal and a control method.

According to a first aspect, an embodiment of the present disclosure provides a mobile terminal, including:

an audio codec, where the audio codec has sound channel output pins; and a control chip, where the control chip and the audio codec are electrically connected to each other, and the control chip is configured to output a compensating voltage signal to the audio codec in processes of enabling and disabling the audio codec, so that a direct current bias voltage of the sound channel output pins is 0V in the processes of enabling and disabling the audio codec.

According to a second aspect, an embodiment of the present disclosure further provides a control method, applied to a mobile terminal and including:

outputting a voltage compensating signal to an audio codec in processes of enabling and disabling the audio codec of the mobile terminal, so that a direct current bias voltage of the sound channel output pins of the audio codec is 0V in the processes of enabling and disabling the audio codec.

According to a third aspect, an embodiment of the present disclosure further provides a mobile terminal, including a processor, a memory, and a program stored in the memory and executable on the processor, where when the program is executed by the processor, the steps of the foregoing control method are implemented.

According to a fourth aspect, an embodiment of the present disclosure further provides a readable storage medium, where the readable storage medium stores a program, and when the program is executed by a processor, the steps of the foregoing control method are implemented.

DESCRIPTION OF THE DRAWINGS

To describe the technical solutions in embodiments of the present disclosure more clearly, the following briefly describes the accompanying drawings required for describing the embodiments of the present disclosure. Clearly, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The technical solutions in embodiments of the present disclosure are described below clearly with reference to the accompanying drawings in the embodiments of the present disclosure. Clearly, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figures 1, 2:
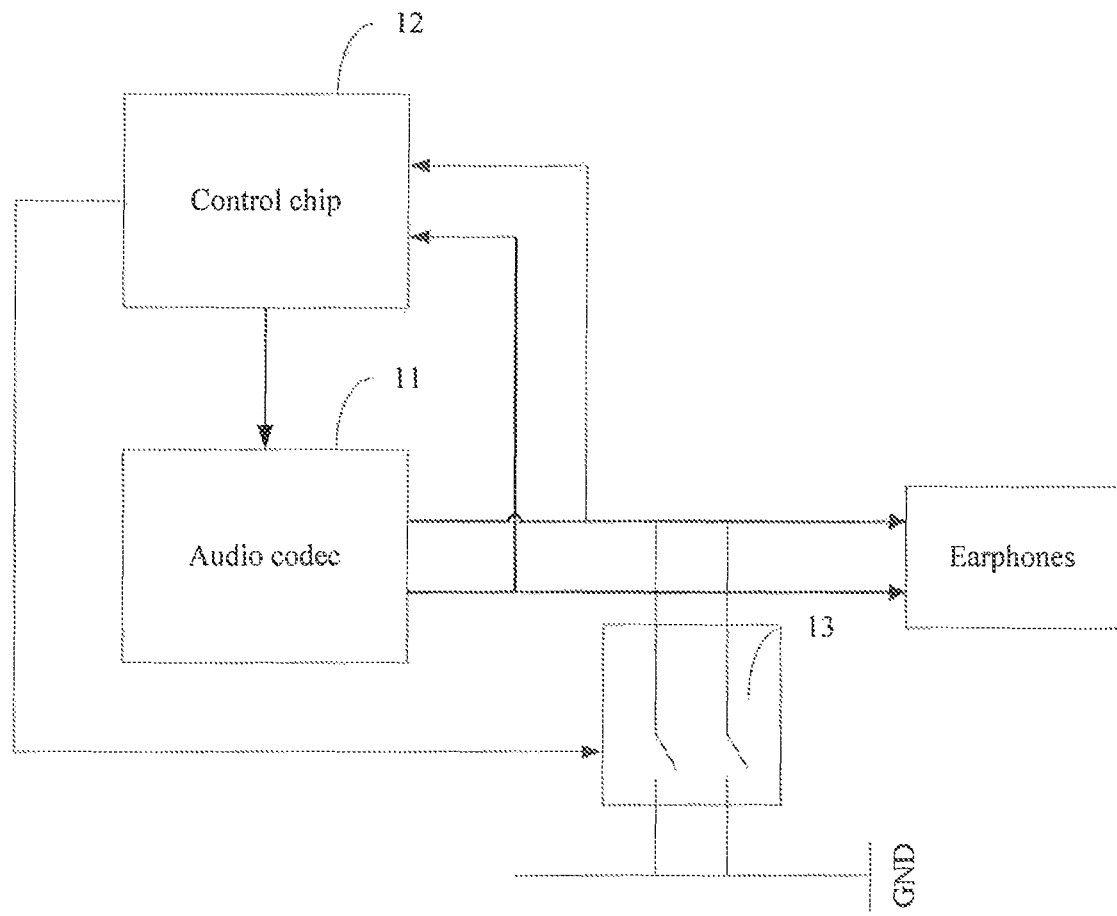
FIG. 1 is a structural diagram 1 of a mobile terminal according to an embodiment of the present disclosure.
FIG. 2 is a flowchart of a control method according to an embodiment of the present disclosure.

Refer to FIG. 1. FIG. 1 is a structural diagram of a mobile terminal according to an embodiment of the present disclosure. As shown in FIG. 1, the mobile terminal provided in this embodiment of the present disclosure includes:

an audio codec 11, where the audio codec 11 has sound channel output pins; and a control chip 12, where the control chip and the audio codec are electrically connected to each other, and the control chip 12 is configured to output a voltage compensating signal to the audio codec 11 in the processes of enabling and disabling the audio codec 11, so that a direct current bias voltage of the sound channel output pins is 0V in the processes of enabling and disabling the audio codec 11.

As shown in FIG. 1, in this embodiment of the present disclosure, the sound channel output pins include a left sound channel output pin and a right sound channel output pin. The left sound channel output pin and the right sound channel output pin are electrically connected to an earphone jack separately. When an earphone plug is connected to the earphone jack, the audio codec 11 could output corresponding voice information to earphones through the left sound channel output pin and right sound channel output pin.

It should be understood that, direct current bias voltages generated at the left sound channel output pin and the right sound channel output pin are the same in the processes of enabling and disabling the audio codec 11.

A process of enabling the audio codec 11 may be understood as a process of changing a state of off to a state of on, and a process of disabling the audio codec 11 may be understood as a process of changing a state of on to a state of off. For example, when the mobile terminal does not play audio, the audio codec 11 is in the state of off; and when the mobile terminal plays audio, the audio codec 11 is in the state of on. In a process of playing audio, if a user selects pausing, the process of disabling the audio codec 11 is performed, and when the user selects playing from pausing, the process of enabling the audio codec 11 is performed. The control chip may output the voltage compensating signal to the audio codec 11 in the processes of enabling and disabling the audio codec 11, so that the voltage compensating signal offsets a direct current component generated by the audio codec 11 in the processes of enabling and disabling the audio codec 11, so that a direct current bias voltage of the left sound channel output pin and the right sound channel output pin of the audio codec 11 is 0V.

In this embodiment of the present disclosure, the voltage compensating signal is output to the audio codec 11 in the processes of enabling and disabling the audio codec 11 of the mobile terminal, and the voltage compensating signal offsets a direct current component generated by the audio codec 11, so that a direct current bias voltage of a left sound channel output pin and a right sound channel output pin of the audio codec 11 is 0V. Therefore, in this embodiment of the present disclosure, a pop sound generated in a mobile terminal is eliminated, thereby improving effects of earphones.

It should be noted that the voltage value of the voltage compensating signal may be detected and determined before the mobile terminal is delivered from a factory. In this embodiment of the present disclosure, to improve accuracy of the voltage compensating signal compensating the direct current component, detection may be performed each time when the mobile terminal is performed, to determine the voltage value of the voltage compensating signal. Specifically, in this embodiment, the control chip 12 is further configured to: in a process of staring the mobile terminal, detect the direct current bias voltage of the sound channel output pins in the processes of enabling and/or disabling the audio codec 11; determine a voltage value of the voltage compensating signal based on the detected direct current bias voltage.

It should be understood that after the mobile terminal receives a start-up instruction, the control chip 12 is powered on and works, and the audio codec 11 is powered on as well (to configure the audio codec 11). After some time (for example, after configuration is completed), the audio codec 11 automatically enters the state of off. Therefore, each time when the mobile terminal is started, a current direct current bias voltage of the audio codec 11 may be detected.

In an optional embodiment, the mobile terminal further includes an electronic switch 13. The electronic switch 13 is electrically connected to the sound channel output pins and the control chip 12 separately. The control chip 12 is further configured to: after the process of staring the mobile terminal is completed, control the sound channel output pins to be electrically connected to the ground terminal through the electronic switch 13 in a case in which there is a direct current bias voltage in the sound channel output pins; control the sound channel output pins to be disconnected with the ground terminal through the electronic switch 13 after a preset time, and output the voltage compensating signal to the audio codec in a case in which the sound channel output pins are electrically connected to the ground terminal.

In this embodiment of the present disclosure, the electronic switch 13 is configured, and the control chip 12 controls the status of the electronic switch 13, so that before the voltage compensating signal is received by the audio codec, the sound channel output pins are controlled to be electrically connected to the ground terminal; and after the voltage compensating signal is sent to the audio codec 11, the sound channel output pins are controlled to be disconnected with the ground terminal. To be specific, the control chip 12 uses the electronic switch 13 to control the sound channel output pins and the ground terminal to be in a grounded state within a segment of time (for example, 1 ms). Within the segment of time, the voltage compensating signal is output to the audio codec 11, thereby ensuring that a direct current bias voltage of the audio codec 11 is 0V. It should be understood that when enabling or disabling of the audio codec 11 is completed, the voltage compensating signal is stopped being output.

Specifically, a specific structure of the electronic switch 13 may be configured based on actual requirements, which, for example, may be a field-effect transistor or a triode, or may be another electronic switch, as long as ground connection and ground disconnection of the sound channel output pins can be implemented. In this embodiment, the sound channel output pins include a left sound channel output pin and a right sound channel output pin. The electronic switch 13 may control the left sound channel output pin and the right sound channel output pin to be electrically connected to the ground terminal at the same time.

It should be noted that in this embodiment of the present disclosure, because the control chip 12 outputs the voltage compensating signal to the audio codec 11 in the processes of enabling and disabling the audio codec 11, the control chip 12 needs to detect the audio codec 11 at the moments of enabling and disabling. In an optional embodiment, trigger instructions of audio playing and stopping may be detected, to determine that the audio codec 11 is enabled. In another embodiment, the direct current bias voltage of the sound channel output pins is detected, to determine the moments of enabling and disabling of the audio codec 11. Specifically, in this embodiment, the control chip 12 is electrically connected to the sound channel output pins. The control chip 12 is specifically configured to: after the process of staring the mobile terminal is completed, use the electronic switch 13 to control the sound channel output pins to be connected to the ground terminal in a case in which there is a direct current bias voltage in the sound channel output pins, use the electronic switch 13 to control the sound channel output pins to be disconnected with the ground terminal after a present time, and output the voltage compensating signal to the audio codec in a case in which the sound channel output pins are connected to the ground terminal.

In this embodiment of the present disclosure, in a process in which an output of a direct current bias voltage of the audio codec 11 changes from a value to 0V, an electric level jump is further generated, and a problem of an extra pop sound is caused. The extra pop sound is to be resolved. In this embodiment of the present disclosure, the sound channel output pins are firstly controlled by using the electronic switch 13 to be electrically connected to the ground terminal, and then the control chip 12 outputs the voltage compensating signal. After the direct current bias voltage of the sound channel output pins is compensated to be 0V by using the voltage compensating signal, the sound channel output pins are controlled to be disconnected with the ground terminal. In this way, the extra pop sound can be prevented.

It should be noted that the various optional implementations described in this embodiment of the present disclosure may be implemented in combination with each other or may be implemented separately, which is not limited in this embodiment of the present disclosure.

Refer to FIG. 2. FIG. 2 is a flowchart of a control method according to an embodiment of the present disclosure. As shown in FIG. 2, the method includes the following steps:

Step 201: A voltage compensating signal is output to an audio codec in processes of enabling and disabling the audio codec of a mobile terminal, so that a direct current bias voltage of sound channel output pins of the audio codec is 0V in the processes of enabling and disabling the audio codec.

Optionally, before the voltage compensating signal is output to the audio codec, the method further includes:

In a process of staring the mobile terminal, the direct current bias voltage of the sound channel output pins is detected in the processes of enabling and/or disabling the audio codec; and
 the voltage value of the voltage compensating signal is determined based on the detected direct current bias voltage.

Optionally, that the voltage compensating signal is output to the audio codec includes:

The sound channel output pins are controlled to be connected to the ground terminal;
 the voltage compensating signal is output to the audio codec in a case in which the sound channel output pins are connected to the ground terminal; and
 the sound channel output pins are controlled to be disconnected with the ground terminal after the voltage compensating signal is output to the audio codec.

Optionally, before the sound channel output pins are controlled to be connected to the ground terminal, the method further includes:

Whether there is a direct current bias voltage in the sound channel output pins is detected; and the sound channel output pins are controlled to be connected to the ground terminal in a case in which a direct current bias voltage is detected in the sound channel output pins.

The control method provided in this embodiment of the present disclosure is applied to the mobile terminal in the foregoing embodiment. For a specific implementation process of the steps of the method, refer to the implementations of the foregoing mobile terminal, and details are not provided herein again.

In this embodiment of the present disclosure, the voltage compensating signal is output to the audio codec in the processes of enabling and disabling the audio codec, and the voltage compensating signal offsets a direct current component generated by the audio codec, so that a direct current bias voltage of a left sound channel output pin and a right sound channel output pin of the audio codec is 0V. Therefore, in this embodiment of the present disclosure, a pop sound generated in a mobile terminal is eliminated, thereby improving effects of earphones.

Figure 3:
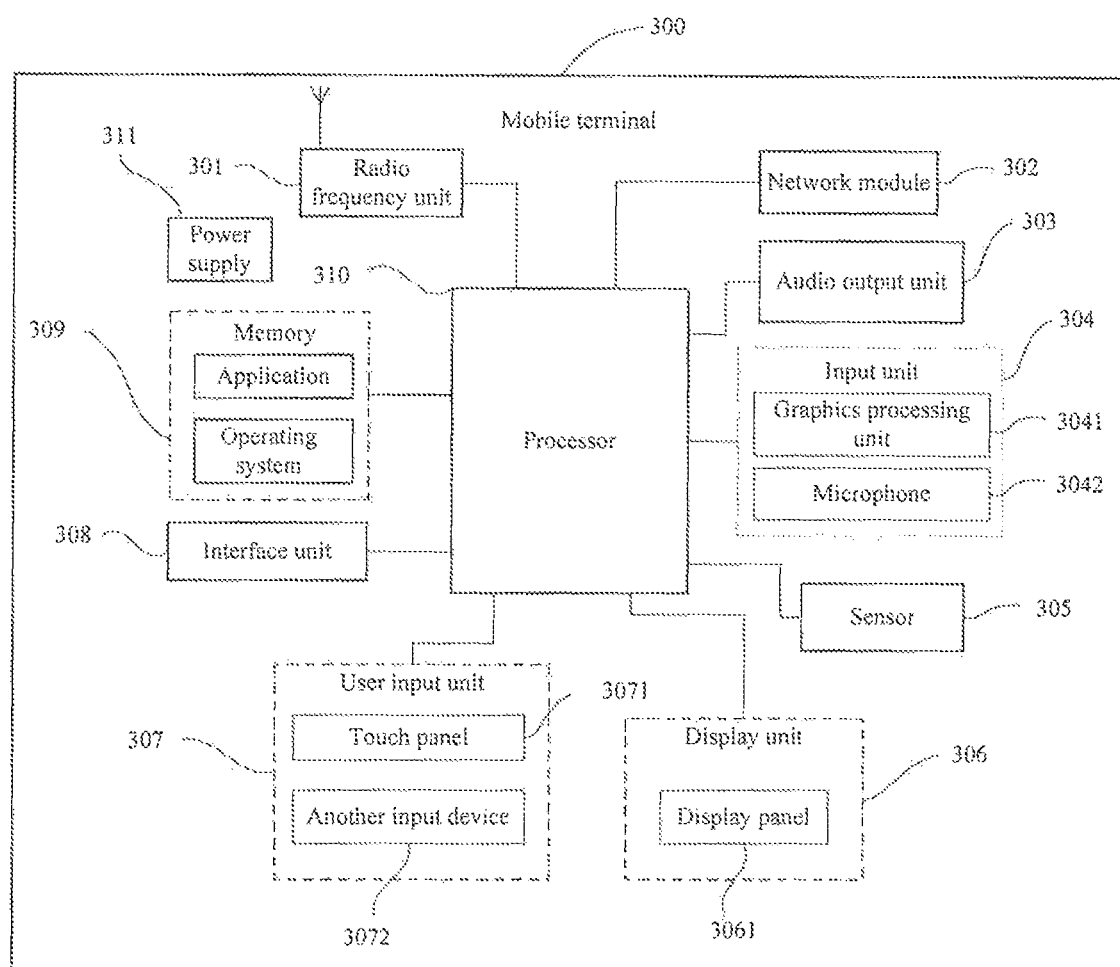
FIG. 3 is a structural diagram 2 of a mobile terminal according to an embodiment of the present disclosure.

FIG. 3 is a schematic diagram of a hardware structure of a mobile terminal implementing various embodiments of the present disclosure.

The mobile terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the mobile terminal shown in FIG. 3 constitutes no limitation on the mobile terminal, and the mobile terminal may include more or fewer components than those shown in the figure, or combine some parts, or have a different component arrangement. In this embodiment of the present disclosure, the mobile terminal includes but is not limited to a mobile phone, a tablet computer, a laptop computer, a palmtop computer, a vehicle-mounted terminal, a wearable device, a pedometer, and the like.

The processor 310 is configured to output a voltage compensating signal to an audio codec in the processes of enabling and disabling the audio codec of the mobile terminal, so that a direct current bias voltage of sound channel output pins of the audio codec is 0V in the processes of enabling and disabling the audio codec.

Optionally, the processor 310 is further configured to: in the process of staring the mobile terminal, detect the direct current bias voltage of the sound channel output pins in the processes of enabling and/or disabling the audio codec; determine the voltage value of the voltage compensating signal based on the detected direct current bias voltage.

Optionally, the processor 310 is specifically configured to: control the sound channel output pins to be connected to a ground terminal, output the voltage compensating signal to the audio codec in a case in which the sound channel output pins are connected to the ground terminal, and control the sound channel output pins to be disconnected with the ground terminal after the voltage compensating signal is output to the audio codec.

Optionally, the processor 310 is further configured to detect whether there is a direct current bias voltage in the sound channel output pins; control the sound channel output pins to be connected to the ground terminal in a case in which a direct current bias voltage is detected in the sound channel output pins.

In this embodiment of the present disclosure, the voltage compensating signal is output to the audio codec in the processes of enabling and disabling the audio codec, and the voltage compensating signal offsets a direct current component generated by the audio codec, so that a direct current bias voltage of a left sound channel output pin and a right sound channel output pin of the audio codec is 0V. Therefore, in this embodiment of the present disclosure, a pop sound generated in a mobile terminal is eliminated, thereby improving effects of earphones.

It should be understood that, in this embodiment of the present disclosure, the radio frequency unit 301 may be configured to receive and send short messages or a signal during a phone call. Specifically, after receiving downlink data from a base station, the radio frequency unit 301 sends the downlink data to the processor 310 for processing; and sends uplink data to the base station. Usually, the radio frequency unit 301 includes but is not limited to an antenna, at least one amplifier, a transceiver, a coupler, a low noise amplifier, a duplexer, and the like. In addition, the radio frequency unit 301 may further communicate with a network and other devices by using a wireless communications system.

The mobile terminal provides wireless broadband Internet access for a user by using the network module 302, for example, helping the user to send and receive an e-mail, brows a web page, and access streaming media.

The audio output unit 303 may convert audio data received by the radio frequency unit 301 or the network module 302 or stored in the memory 309 to an audio signal and output the audio signal as a sound. In addition, the audio output unit 303 may further provide an audio output (for example, a call signal received sound, or a message received sound) related to a specific function implemented by the mobile terminal 300. The audio output unit 303 includes a loudspeaker, a buzzer, a receiver, and the like.

The input unit 304 is configured to receive audio or video signals. The input unit 304 may include a graphics processing unit (GPU) 3041 and a microphone 3042. The graphics processing unit 3041 is configured to process image data of a static picture or a video obtained by an image capturing device (for example, a camera) in a video capturing mode or an image capturing mode. A processed image frame may be displayed on the display unit 306. The image frame processed by the graphics processing unit 3041 may be stored in the memory 309 (or other storage mediums) or sent by using the radio frequency unit 301 or the network module 302. The microphone 3042 may receive a sound and can process such a sound into audio data. The processed audio data may be converted, in a telephone call mode, into a format that may be sent by the radio frequency unit 301 to a mobile communication base station for output.

The mobile terminal 300 may further include at least one sensor 305 such as an optical sensor, a motion sensor, and another sensor. Specifically, the optical sensor includes an ambient light sensor and a proximity sensor. The ambient light sensor may adjust luminance of a display panel 3061 based on brightness of ambient light, and the proximity sensor may disable the display panel 3061 and/or backlight when the mobile terminal 300 approaches an ear. As a type of the motion sensor, an accelerometer sensor may detect an acceleration value in each direction (generally, three axes), and detect a value and a direction of gravity when the accelerometer sensor is static, and may be used for recognizing a mobile terminal posture (such as screen switching between landscape and portrait modes, a related game, or magnetometer posture calibration), a function related to vibration recognition (such as a pedometer or a knock), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information entered by a user or information provided for a user. The display unit 306 may include the display panel 3061, and the display panel 3061 may be configured in a form of a liquid crystal display (LCD), an organic light-emitting diode (OLED), or the like.

The user input unit 307 may be configured to: receive input digit or character information, and generate a key signal input related to user settings and function control of the mobile terminal. Specifically, the user input unit 307 includes a touch panel 3071 and another input device 3072. The touch panel 3071 is also referred to as a touchscreen, and may acquire a touch operation performed by a user on or near the touch panel 3071 (such as an operation performed by a user on the touch panel 3071 or near the touch panel 3071 by using any proper object or accessory, such as a finger or a stylus). The touch panel 3071 may include two parts: a touch detection device and a touch controller. The touch detection apparatus detects a touch location of the user, detects a signal carried by a touch operation, and transmits the signal to the touch controller.

The touch controller receives touch information from the touch detection apparatus, converts the touch information to touch point coordinates, sends the touch point coordinates to the processor 310, and receives and executes a command from the processor 310. In addition, the touch panel 3071 may be implemented in various types such as resistive, capacitive, infrared, and surface acoustic wave. In addition to the touch panel 3071, the user input unit 307 may further include the another input device 3072. Specifically, the another input device 3072 may include but is not limited to a physical keyboard, function keys (for example, a volume control key and an on/off key), a trackball, a computer mouse, and a joystick. Details are not described herein.

Optionally, the touch panel 3071 may cover the display panel 3061. When detecting a touch operation on or near the touch panel 3071, the touch panel 3071 transmits the touch operation to the processor 310 to determine a touch event type. Then, the processor 310 provides a corresponding visual output on the display panel 3061 based on the touch event type. In FIG. 3, the touch panel 3071 and the display panel 3061 are used as two independent components to implement input and output functions of the mobile terminal. However, in some embodiments, the touch panel 3071 and the display panel 3061 may be integrated to implement the input and output functions of the mobile terminal. This is not specifically limited herein.

The interface unit 308 is an interface connecting an external apparatus to the mobile terminal 300. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, an earphone port, and the like. The interface unit 308 may be configured to: receive an input (for example, data information and power) from the external apparatus, and transmit the received input to one or more elements inside the mobile terminal 300; or may be configured to transmit data between the mobile terminal 300 and the external apparatus.

The memory 309 may be configured to store a software program and various data. The memory 309 may mainly include a program storage area and a data storage area. The program storage area may store an operating system, an application for at least one function (for example, a sound play function or an image play function), and the like. The data storage area may store data (for example, audio data or an address book) or the like created based on use of a mobile phone. In addition, the memory 309 may include a high-speed random access memory, or may include a nonvolatile memory, for example, at least one disk storage device, a flash memory, or another volatile solid-state storage device.

The processor 310 is a control center of the mobile terminal, and is connected to various parts of the entire mobile terminal through various interfaces and lines, and performs various functions of the mobile terminal and processes data by running or executing the software program and/or the module that are/is stored in the memory 309 and invoking the data stored in the memory 309, to implement overall monitoring on the mobile terminal. The processor 310 may include one or more processing units. Optionally, the processor 310 may integrate an application processor and a modem processor. The application processor mainly processes an operating system, a user interface, an application, and the like. The modem processor mainly processes wireless communication. It should be understood that the modem processor may not be integrated in the processor 310.

The mobile terminal 300 may further include a power supply 311 (such as a battery) that supplies power to various components. Optionally, the power supply 311 may be logically connected to the processor 310 by using a power supply management system, to implement functions such as charging, discharging, and power consumption management by using the power supply management system.

In addition, the mobile terminal 300 includes some function modules not shown, and details are not described herein.

Optionally, an embodiment of the present disclosure further provides a mobile terminal, including a processor 310, a memory 309, and a program stored in the memory 309 and executable on the processor 310. When executing the program, the processor 310 implements the processes in the control method embodiment and same technical effects can be achieved. To avoid repetition, details are not described herein again.

An embodiment of the present disclosure further provides a readable storage medium. The readable storage medium stores a program, and the program, when executed by a processor, implements the processes in the control method embodiment and same technical effects can be achieved. To avoid repetition, details are not described herein again. The readable storage medium includes a computer-readable storage medium, for example, a read-only memory (ROM for short), a random access memory (RAM for short), a magnetic disk, an optical disc, or the like.

A person of ordinary skill in the art may realize that units and algorithm steps of various examples described with reference to the embodiments disclosed in this specification can be implemented by using electronic hardware, or a combination of a computer software and electronic hardware. Whether these functions are performed by using hardware or software depends on a specific application and design constraints of the technical solution. A person skilled in the art may use different methods to achieve the described functions for each particular application, but it should not be considered that the implementation goes beyond the scope of the present disclosure.

A person skilled in the art may clearly understand that, for convenient and simple description, for the specific working processes of the system, apparatus and unit described above, reference may be made to a corresponding process in the foregoing method embodiments, and details are not described herein again.

In the embodiments provided in the present disclosure, it should be understood that the disclosed apparatus and method may be implemented in other manners. For example, the apparatus embodiment described above is only an example. For example, division into the units is only logical function division. There may be other division manners in actual implementation, for example, a plurality of units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on a plurality of network units. Some or all of the units may be selected based on actual requirements to achieve the objectives of the solutions of the embodiments of the present disclosure.

In addition, functional units in each embodiment of the present disclosure may be integrated into one processing unit, or each unit may have separate physical existence, or two or more units may be integrated in one unit.

If the functions are implemented with a form of software function units and sold or used as independent products, the functions may be stored in a computer-readable storage medium. Based on this understanding, the essence of the technical solutions of the present disclosure, the part contributing to the prior art, or some of the technical solutions may be represented in a form of software product. The computer software product is stored in a storage medium, and include several instructions to enable a computer device (which may be a personal computer, a server, a network device, or the like) to perform all or some of the steps of the method described in various embodiments of the present disclosure. The foregoing storage medium includes various media, such as a USB flash disk, a removable hard disk, a ROM, a RAM, a magnetic disk, or an optical disc, that can store program code.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A mobile terminal, comprising:
    an audio codec, wherein the audio codec has sound channel output pins;
    a control chip, wherein the control chip and the audio codec are electrically connected to each other, and the control chip is configured to output a voltage compensating signal to the audio codec in processes of enabling and disabling the audio codec, so that a direct current bias voltage of the sound channel output pins is 0V in the processes of enabling and disabling the audio codec; wherein the control chip is further configured to: in a process of starting the mobile terminal, detect the direct current bias voltage of the sound channel output pins in the processes of enabling and/or disabling the audio codec; and determine a voltage value of the voltage compensating signal based on the detected direct current bias voltage; and
    an electronic switch, wherein the electronic switch is electrically connected to the sound channel output pins and the control chip separately; the control chip is specifically configured to: control the sound channel output pins to be electrically connected to a ground terminal through the electronic switch, output the voltage compensating signal to the audio codec in a case in which the sound channel output pins are electrically connected to the ground terminal, and control the sound channel output pins to be disconnected with the ground terminal through the electronic switch after the voltage compensating signal is output to the audio codec.

2. The mobile terminal according to claim 1, wherein the control chip is electrically connected to the sound channel output pins, and the control chip is specifically configured to: after the process of starting the mobile terminal is completed, control the sound channel output pins to be electrically connected to the ground terminal through the electronic switch in a case in which there is a direct current bias voltage in the sound channel output pins; control the sound channel output pins to be disconnected with the ground terminal through the electronic switch after a preset time, and output the voltage compensating signal to the audio codec in a case in which the sound channel output pins are electrically connected to the ground terminal.

3. A control method, applied to a mobile terminal and comprising:
    outputting a voltage compensating signal to an audio codec in processes of enabling and disabling the audio codec of the mobile terminal, so that a direct current bias voltage of the sound channel output pins of the audio codec is 0V in the processes of enabling and disabling the audio codec;

wherein before the outputting a voltage compensating signal to an audio codec, the method further comprises:

in a process of starting the mobile terminal, detecting the direct current bias voltage of the sound channel output pins in the processes of enabling and/or disabling the audio codec; and determining a voltage value of the voltage compensating signal based on the detected direct current bias voltage;

wherein the outputting a voltage compensating signal to an audio codec comprises:

controlling the sound channel output pins to be electrically connected to the ground terminal;

outputting the voltage compensating signal to the audio codec in a case in which the sound channel output pins are electrically connected to the ground terminal;

controlling the sound channel output pins to be disconnected with the ground terminal after the voltage compensating signal is output to the audio codec.

4. The method according to claim 3, wherein before the controlling the sound channel output pins to be electrically connected to the ground terminal, the method further comprises:

detecting whether there is a direct current bias voltage in the sound channel output pins; controlling the sound channel output pins to be electrically connected to the ground terminal in a case in which a direct current bias voltage is detected in the sound channel output pins.

5. A mobile terminal, comprising a processor, a memory, and a program stored in the memory and executable on the processor, wherein when the program is executed by the processor, the steps of the control method are implemented, wherein the method comprises:

outputting a voltage compensating signal to an audio codec in processes of enabling and disabling the audio codec of the mobile terminal, so that a direct current bias voltage of the sound channel output pins of the audio codec is 0V in the processes of enabling and disabling the audio codec;

wherein when the program is executed by the processor, the processor further implements, before the outputting a voltage compensating signal to an audio codec, in a process of starting the mobile terminal, detecting the direct current bias voltage of the sound channel output pins in the processes of enabling and/or disabling the audio codec; and determining a voltage value of the voltage compensating signal based on the detected direct current bias voltage;

wherein the outputting a voltage compensating signal to an audio codec comprises:

controlling the sound channel output pins to be electrically connected to the ground terminal;

outputting the voltage compensating signal to the audio codec in a case in which the sound channel output pins are electrically connected to the ground terminal;

controlling the sound channel output pins to be disconnected with the ground terminal after the voltage compensating signal is output to the audio codec.

6. The mobile terminal according to claim 5, wherein when the program is executed by the processor, the processor further implements, before the controlling the sound channel output pins to be electrically connected to the ground terminal, detecting whether there is a direct current bias voltage in the sound channel output pins; controlling the sound channel output pins to be electrically connected to the ground terminal in a case in which a direct current bias voltage is detected in the sound channel output pins.

7. A non-transitory readable storage medium, wherein the readable storage medium stores a program, and when the program is executed by a processor, the steps of the control method according to claim 3 are implemented.

* * * * *